United States Patent
Erb

(10) Patent No.: US 8,059,810 B2
(45) Date of Patent: Nov. 15, 2011

(54) ROLE-BASED PROGRAMMABLE TELEPHONE KEYS

(75) Inventor: Paul Andrew Erb, Ottawa (CA)

(73) Assignee: Mitel Networks Corporation, Ottawa, Ontario (CA)

(*) Notice: Subject to any disclaimer, the term of this patent is extended or adjusted under 35 U.S.C. 154(b) by 1022 days.

(21) Appl. No.: 11/770,435

(22) Filed: Jun. 28, 2007

(65) Prior Publication Data

US 2009/0003581 A1 Jan. 1, 2009

(51) Int. Cl.
*H04M 3/42* (2006.01)

(52) U.S. Cl. ......... 379/216.01; 379/211.02; 379/212.01; 379/93.23; 379/368; 379/199

(58) Field of Classification Search .................. 379/201, 379/211, 212, 368, 199, 207; 455/556.1, 455/564, 418; 704/104.1
See application file for complete search history.

(56) References Cited

U.S. PATENT DOCUMENTS

| | | | | |
|---|---|---|---|---|
| 5,412,713 | A | * | 5/1995 | Baals et al. .................. 379/457 |
| 5,790,652 | A | * | 8/1998 | Gulley et al. ................. 379/368 |
| 5,917,905 | A | | 6/1999 | Whipple et al. |
| 6,075,851 | A | | 6/2000 | Pinard |
| 6,453,179 | B1 | | 9/2002 | Larsen |
| 6,816,589 | B2 | | 11/2004 | Pinard |
| 6,989,820 | B1 | | 1/2006 | Baker et al. |
| 7,676,498 | B2 | * | 3/2010 | England et al. ........ 707/999.107 |
| 2003/0103165 | A1 | | 6/2003 | Bullinger |
| 2005/0170863 | A1 | * | 8/2005 | Shostak ..................... 455/556.1 |
| 2006/0128437 | A1 | * | 6/2006 | Kim .............................. 455/564 |
| 2007/0042764 | A1 | * | 2/2007 | Peon et al. .................... 455/418 |
| 2007/0218956 | A1 | | 9/2007 | Nieminen |
| 2007/0281747 | A1 | * | 12/2007 | Pletikosa et al. ............. 455/564 |
| 2008/0063171 | A1 | * | 3/2008 | Ho et al. .................. 379/201.02 |

FOREIGN PATENT DOCUMENTS

| | | |
|---|---|---|
| CN | 1430850 A | 7/2003 |
| DE | 10 2004 046 856 A1 | 4/2006 |
| WO | WO 01/91457 A1 | 11/2001 |
| WO | WO2005-112408 | 11/2005 |
| WO | WO 2006/034919 A1 | 4/2006 |

* cited by examiner

Primary Examiner — Joseph J Nguyen

(57) ABSTRACT

A method of configuring a telephone, comprising configuring a plurality of self-labeling Role Keys to represent respective user roles, and configuring a plurality of self-labeling Role Associated Keys associated with respective ones of the self-labeling Role Keys such that upon user selection of one of the self-labeling Role Keys representing a predetermined user role, the plurality of self-labeling Role Associated Keys are presented to the user for invoking respective features associated with the selected user role.

11 Claims, 5 Drawing Sheets

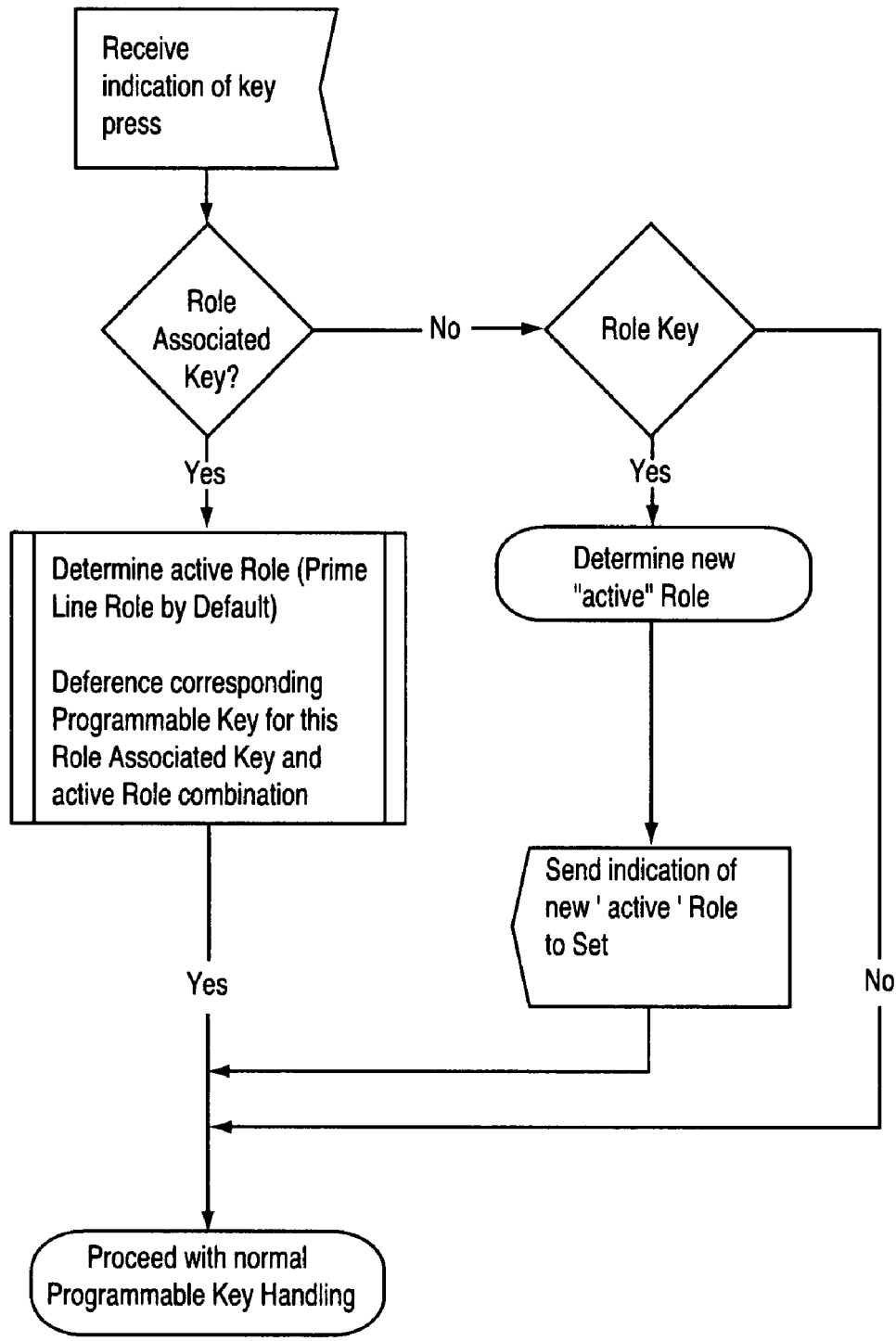

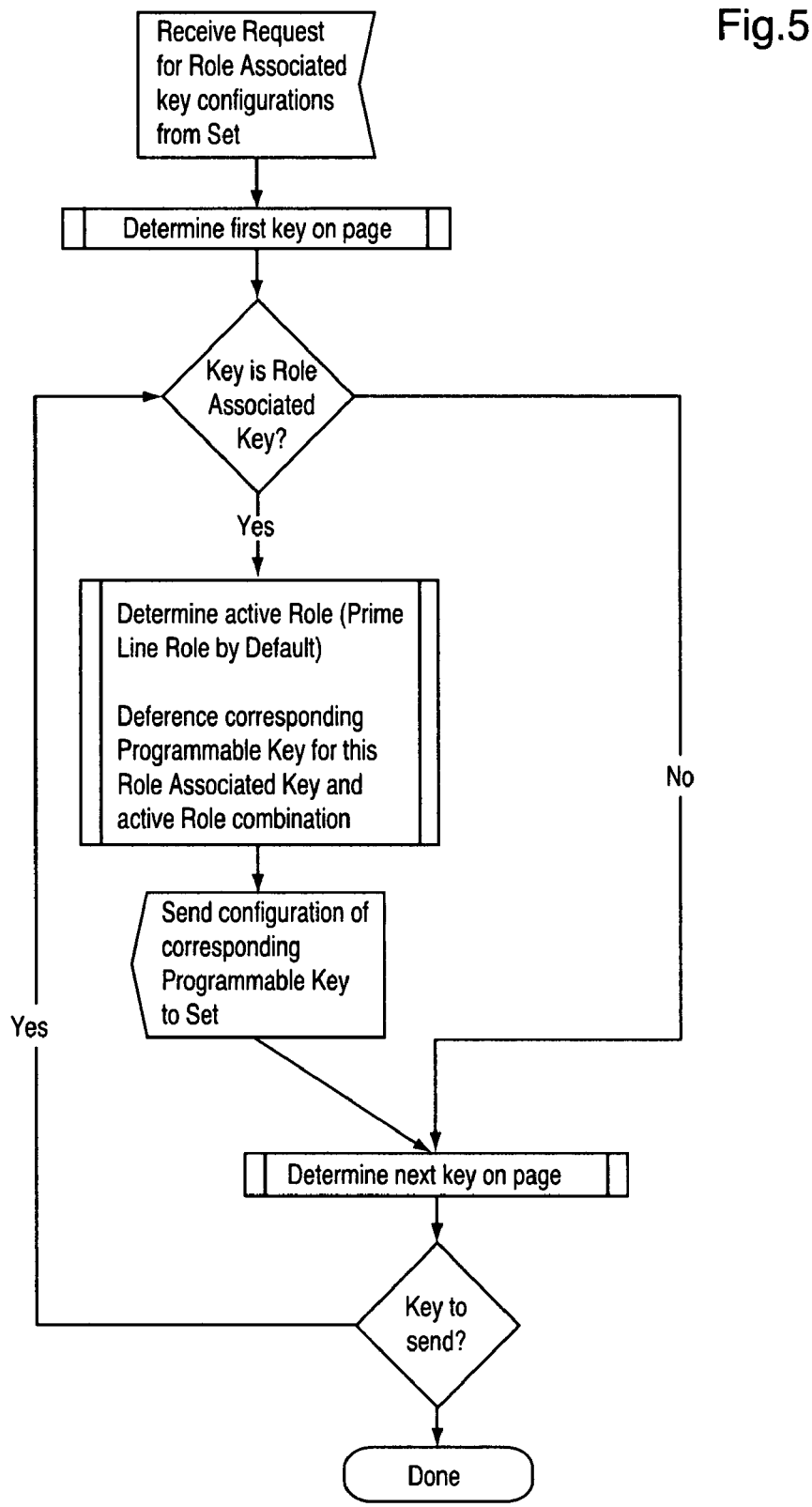

ROLE-BASED PROGRAMMABLE TELEPHONE KEYS

BACKGROUND

1. Field

This specification relates generally to communication systems, and more particularly to the presentation of information on a telephone appliance.

2. Description of the Related Art

U.S. Pat. No. 6,816,589 (Pinard) sets forth a communication system wherein a plurality of user data files are provided for respective users, each user data file including at least one role identifier; a plurality of communication groups having respective group name identifiers for associating predetermined roles with the groups and respective group phone numbers; and a role list data file for automatically associating respective ones of the users with a predetermined one or more of the communication groups according to their role identifiers.

U.S. Pat. No. 6,075,851 (Pinard) sets forth a communication system with a database representing a plurality of relationships of organization roles, including names of first persons filling the roles, names of temporary persons to fill at least some specific roles, directory numbers associated with respective ones of the first and temporary persons, and call features associated with respective specific roles. In response to a request to complete a call to a particular directory number associated with one of the specific roles, a method is disclosed for looking up in the database an alternative directory number of the person temporarily associated with the specific role, and processing the call to the alternate directory number instead of the particular directory number, but with call features associated with the specific role.

From the foregoing, it is known in the prior art that a telephone set user may perform multiple roles within an organization, and that those roles may change throughout the course of a typical business day. These roles may include: managerial responsibilities; participation in a committee or working group; consultant or subject matter expert; parent/spouse/friend; team organizer; and many other roles.

It is also known in the art for such a person to use programmable keys on their telephone to make/receive calls and invoke related features. However, such making/receiving of calls and invoking of features is done without consideration to which role the user is filling.

Since the number or programmable keys presented on a telephone set is limited, the user typically only configures features, speed dial buttons, etc. that are most often used (or necessary) regardless of what role the user is filling.

It is possible to increase the number of available programmable keys on a telephone set by introducing tabs and other navigation elements to allow paging between groups of programmable keys. It is also possible for the user to decide which features, speed dial, etc. to configure, and then group them logically within the layout of programmable keys supported by the telephone set. Another option often used by secretarial/sub-attendants is to also use an adjunct programmable key module (PKM) to increase the available number of programmable keys.

However, in the context of a user filling multiple roles the increase in number of available programmable keys increases the complexity of user selection of a feature related to a role. For example, important programmable keys may not be available when desired, as a result of having a different tab visible (i.e. managerial DN/line appearance/etc.)

Additionally, a 'Hot Desking' capability can be used to overlay the programmable keys associated with a particular role onto a telephone set (e.g. activated by user login to the phone). However, only programmable keys configured for the logged in user/role are available.

SUMMARY

It is an object of an aspect of this specification to set forth a programmable key configuration for designating groupings of programmable keys as Role Keys, Role Associated Keys and Role Independent Keys. Role Associated Keys are available for configuration associated with each Role Key (excluding the Prime Line). Selection of a Role Key on the telephone set results in the normally configured programmable key behavior and, additionally, overlays the associated Role Associated Keys on designated programmable keys of the telephone set.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is a flowchart showing method steps responsive to user selection of a programmed key at the telephone appliance of FIG. 2, according to another aspect of an embodiment; and FIG. 5 is a flowchart showing method steps for configuring Role Associated Keys associated with an active Role Key of the telephone appliance of FIG. 2, according to an aspect of an embodiment.

DETAILED DESCRIPTION OF THE PREFERRED EMBODIMENTS

Figure 1:
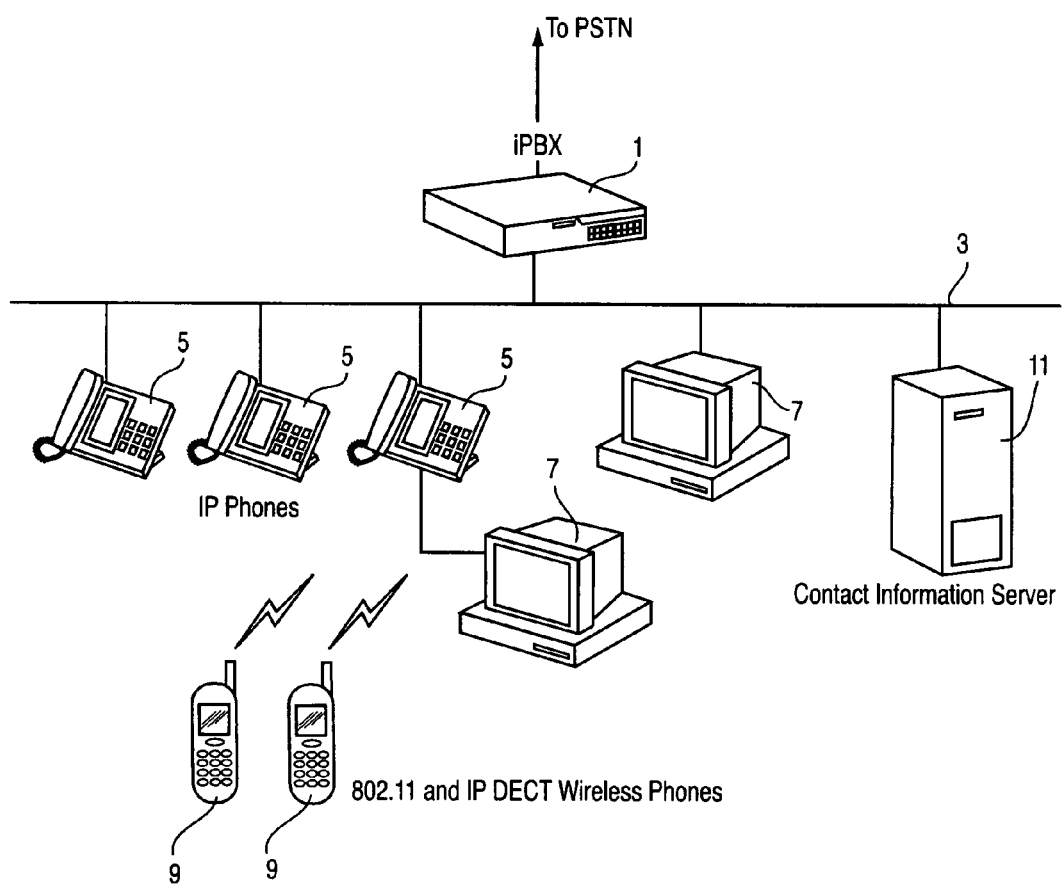
FIG. 1 is a block diagram of an exemplary communication system.

With reference to FIG. 1, an exemplary communication system is shown comprising a communication switch such as an IP PBX otherwise known as an iPBX 1 (e.g. Mitel 3300 ICP or Mitel SX-200 ICP) connected to a local area network (LAN 3) and to the Public Switched Telephone Network (PSTN). A plurality of telephone devices such as IP phones 5 and desktop computers 7 running phone applications, etc. are connected to the LAN 3, as well as wireless phones 9 and an application server 11, such as a contact information server.

A person of skill in the art will appreciate that the configuration of FIG. 1 is representative of a typical converged communication network, and that numerous variations in configuration, components, etc. are possible.

Figure 2:
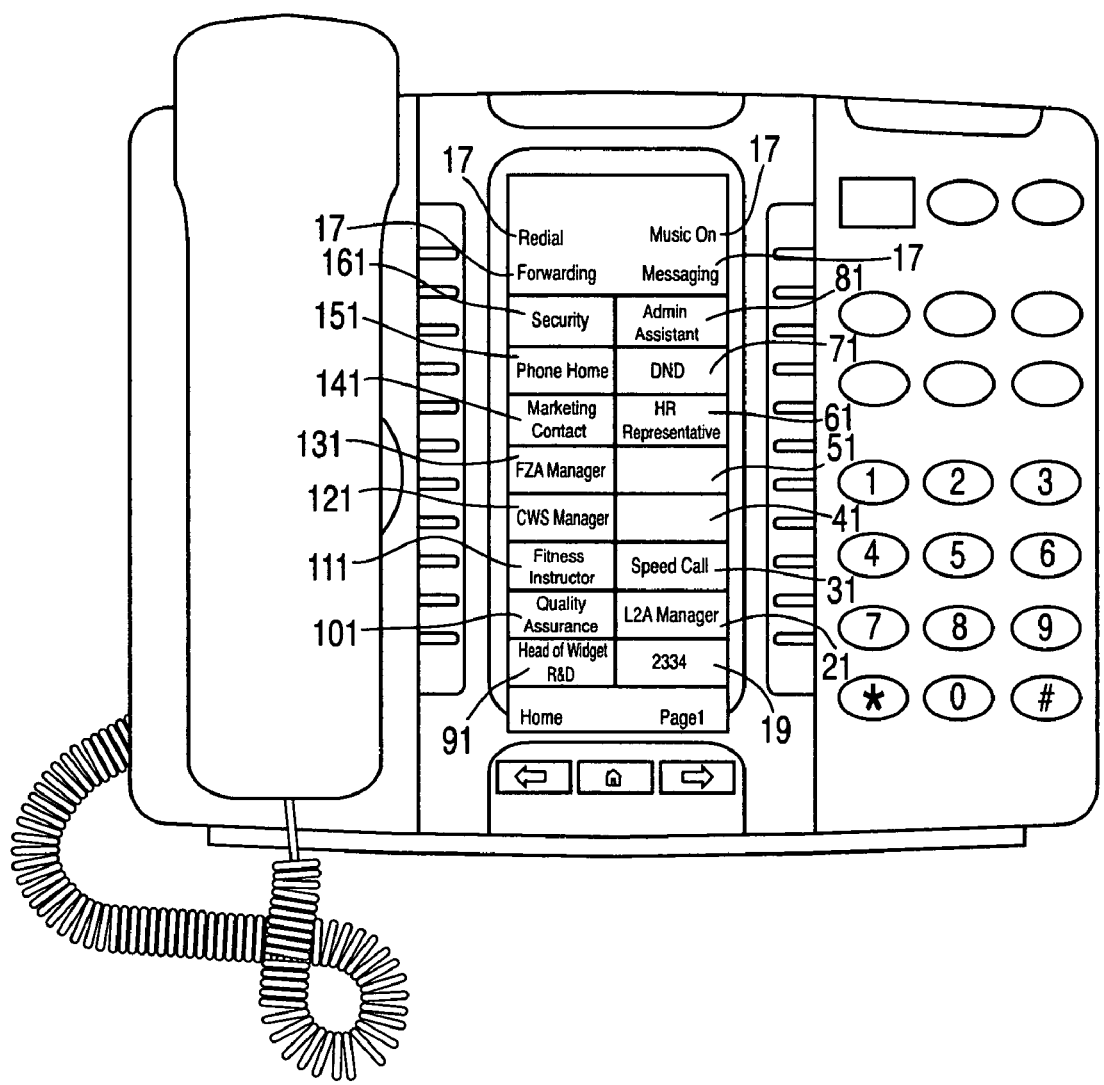
FIG. 2 shows an exemplary telephone appliance in accordance with an aspect of an embodiment.

FIG. 2 shows an IP phone (e.g. a 5340 device manufactured by Mitel Networks Corporation) having a Prime Line key 19 representing the default 'role' for the user at extension 2334; four non-self-labeling keys 17 (for activating well known system features such as Redial, Forwarding, Music On and Messaging); and sixteen self-labeling programmable keys. The bottom six self-labeling programmable keys 19, 21, 31, 91, 101 and 111 are designated as Role Keys, the middle six keys 41, 51, 61, 121, 131 and 141 are designated as Role Associated Keys, and the remaining (top) four keys 71, 81, 151 and 161 are designated as Role Independent Keys. This designation may be specified in a Role Layout configuration that is specific to a given device/DN/user or is applied to all devices/DNs/users with the feature enabled. The actual numbers of keys can be any combination or order, system configuration selected, or limited to a choice of specific combinations.

Table 1 shows an exemplary system configuration for assignment of Role Keys for an exemplary telephone system, wherein each "Button #" configured within the PBX corresponds to a "Key #" on the telephone set of FIG. 2.

TABLE 1

| Key # | Button # | Role Key Type |
| --- | --- | --- |
| 21 | 2 | Role Key Allowed |
| 31 | 3 | Role Key Allowed |
| 41 | 4 | Role Associated Key |
| 51 | 5 | Role Associated Key |
| 61 | 6 | Role Associated Key |
| 71 | 7 | Role independent Key |
| 81 | 8 | Role independent Key |
| 91 | 9 | Role Key Allowed |
| 101 | 10 | Role Key Allowed |
| 111 | 11 | Role Key Allowed |
| 121 | 12 | Role Associated Key |
| 131 | 13 | Role Associated Key |
| 141 | 14 | Role Associated Key |
| 151 | 15 | Role independent Key |
| 161 | 16 | Role independent Key |

Thus, in the exemplary embodiment of FIG. 2, Role Keys 21, 31, 91, 101 and 111 may be selected by the user depending on what role the user is performing at any given time. Role keys can be existing DN/line appearances/speedcalls/etc and provide their existing behaviour in addition to causing presentation of associated Role Associated programmable keys, as set forth below.

For each selected role (except for the Prime Line), the user may configure Role Associated programmable keys 41, 51, 61, 121, 131 and 141 to perform certain functions that are useful for the selected role. Selection of a Role Key on the telephone set results in the normally configured programmable key behaviour and, additionally, overlays the selected Role Key's associated Role Associated Keys on the designated programmable keys 41, 51, 61, 121, 131 and 141. Thus, for the embodiment of FIG. 2, wherein the 'Head of Widget R&D' role is active, role key 91 performs its usual function of a single line key, programmable keys 41 and 51 are blank (not programmed), key 61 is a speed call to 'HR Representative', key 121 is a speed call to 'CWS Manager', key 131 is a speed call to 'FZA Manager', and key 141 is a speed call to 'Marketing Contact'. The layout of Role Keys, Role Associated Keys and Role Independent Keys is configured from an allowed/supported choice of layouts (that can be specific to a particular telephone set's capabilities) or as a tailored layout based on user preference.

Role-independent keys 71, 81, 151 and 161 may be programmed by the user for activation of Do Not Disturb (DND), Admin Assistant (speed call), Phone Home (speed call) and Security (speed call), in a well-known manner.

Table 2 shows non-limiting example of a system configuration for assignment of Role Keys for the user 'Eldon Smith' at prime line extension 2334 on the exemplary telephone device of FIG. 2.

TABLE 2

Multiline Set 2334 (Edison Smith)

| Button | Label | Line Type | DN | Role Key Enabled | Associated Button and Role |
| --- | --- | --- | --- | --- | --- |
| 2 | L2A Manager | Key System | 2074 | Yes | Role Key Candidate (buttons 49-54) |
| 3 | Speedcall | Speedcall | 3423 | No | Role Key Candidate (buttons 55-60) |
| 4 | Peer Reviewer | Speedcall | 2335 | (blank - not allowed) | 4 - Default Role (2334) |
| 5 | Colleague | User Speedcall | (blank) | (blank - not allowed) | 5 - Default Role (2334) |
| 6 | Collaborator | User Speedcall | *** | (blank - not allowed) | 6 - Default Role (2334) |
| 7 | Do Not Disturb | DND Feature | (blank) | (blank - not allowed) | Role Independent |
| 8 | Admin Assistant | Speedcall | 2335 | (blank - not allowed) | Role Independent |
| 9 | Head of Widget R&D | Single Line | 4279 | Yes | Role Key Candidate (buttons 61-66) |
| 10 | Quality Assurance | Key System | 2353 | Yes | Role Key Candidate (buttons 67-72) |
| 11 | Fitness Instructor | Single Line | 5123 | Yes | Role Key Candidate (buttons 73-78) |
| 12 | Team Leader | Key System | 2361 | (blank - not allowed) | 12 - Default Role |
| 13 | Team Manager | Speedcall | 2344 | (blank - not allowed) | 13 - Default Role |
| 14 | Marketing Contact | User Speedcall | *** | (blank - not allowed) | 14 - Default Role |
| 15 | Home Phone | User Speedcall | *** | (blank - not allowed) | Role Independent |
| 16 | Security | System Speedcall | 4444 | (blank - not allowed) | Role Independent |
| <Additional Pages of Programmable Keys i.e. 2 pages of 16 | | | | | |
| 49 | L2A Team Member 1 | Speedcall | 2378 | (blank - not allowed) | 4 - L2A Manager |
| 50 | L2A Team Member 2 | Speedcall | 2364 | (blank - not allowed) | 5 - L2A Manager |
| 51 | L2A Product Support | Speedcall | 3927 | (blank - not allowed) | 6 - L2A Manager |
| 52 | | Not assigned | (blank) | (blank - not allowed) | 12 - L2A Manager |
| 53 | | Not assigned | (blank) | (blank - not allowed) | 13 - L2A Manager |
| 544 | | Not assigned | (blank) | (blank - not allowed) | 14 - L2A Manager |
| 55 | | Not assigned | (blank) | (blank - not allowed) | 4 - (not available) |
| 56 | | Not assigned | (blank) | (blank - not allowed) | 5 - (not available) |
| 57 | | Not assigned | (blank) | (blank - not allowed) | 6 - (not available) |
| 58 | | Not assigned | (blank) | (blank - not allowed) | 12 - (not available) |
| 59 | | Not assigned | (blank) | (blank - not allowed) | 13 - (not available) |
| 60 | | Not assigned | (blank) | (blank - not allowed) | 14 - (not available) |
| 61 | | Not assigned | (blank) | (blank - not allowed) | 4 - Head of Widget R&D |
| 62 | | Not assigned | (blank) | (blank - not allowed) | 5 - Head of Widget R&D |

TABLE 2-continued

Multiline Set 2334 (Edison Smith)

| Button | Label | Line Type | DN | Role Key Enabled | Associated Button and Role |
|---|---|---|---|---|---|
| 63 | HR Representative | User Speedcall | *** | (blank - not allowed) | 6 - Head of Widget R&D |
| 64 | CWS Manager | Key System | 2312 | (blank - not allowed) | 12 - Head of Widget R&D |
| 65 | FZA Manager | Key System | 2368 | (blank - not allowed) | 13 - Head of Widget R&D |
| 66 | Marketing Contact | User Speedcall | *** | (blank - not allowed) | 14 - Head of Widget R&D |
| 67 | | Not assigned | (blank) | (blank - not allowed) | 4 - Quality Assurance |
| 68 | | Not assigned | (blank) | (blank - not allowed) | 5 - Quality Assurance |
| 69 | | Not assigned | (blank) | (blank - not allowed) | 6 - Quality Assurance |
| 70 | | Not assigned | (blank) | (blank - not allowed) | 12 - Quality Assurance |
| 71 | | Not assigned | (blank) | (blank - not allowed) | 13 - Quality Assurance |
| 72 | | Not assigned | (blank) | (blank - not allowed) | 14 - Quality Assurance |
| 73 | | Not assigned | (blank) | (blank - not allowed) | 4 - Fitness Instructor |
| 74 | | Not assigned | (blank) | (blank - not allowed) | 5 - Fitness Instructor |
| 75 | | Not assigned | (blank) | (blank - not allowed) | 6 - Fitness Instructor |
| 76 | | Not assigned | (blank) | (blank - not allowed) | 12 - Fitness Instructor |
| 77 | | Not assigned | (blank) | (blank - not allowed) | 13 - Fitness Instructor |
| 78 | | Not assigned | (blank) | (blank - not allowed) | 14 - Fitness Instructor |

Thus, in Table 2, Buttons 2-16 represent the configuration of self-labeling keys for the Prime Line default role, with additional pages of Role Associated Keys 41, 51, 61, 121, 131 and 141 (corresponding to buttons 4, 5, 6, 12, 13 and 14, respectively) for each selected Role of "L2A Manager" (Role Key 21, "Speedcall" (Role Key 31), "Head of Widget R&D" (active Role Key 91 shown in FIG. 2), "Quality Assurance" (Role Key 101) and "Fitness Instructor" (Role Key 111). The Role Associated Keys may be programmed for system or user speed call, key system, or other function useful to the user's selected role.

As shown in Table 2, the PBX 1 preferably begins numbering of the additional keys after all other keys on the set (including PKM keys, if applicable), and as a result of configuration changes to the user-selected role layout or associated telephone set (button count) and PKM configuration.

Role Associated Keys 41, 51, 61, 121, 131 and 141 are configured, similar to other programmable keys, using a Desktop Config or Group Admin tool (e.g. Enterprise Systems Management (ESM)) which visually displays the association between a Role Key and its corresponding Role Associated Keys. Alternatively, the user can configure the Role Associated Keys using a Settings Shutter or similar application in the telephone 5 (that also clearly displays the association to the user).

A person of skill in the art will appreciate that configuration of the programmable keys that are designated as Role Keys 21, 31, 91, 101 and 111 and Role Independent Keys 71, 81, 151 and 161, is not normally affected by the inventive system set forth herein. Additional pages/tabs of keys will continue to be supported using the existing configuration of programmable keys (as Role Independent Keys) and numerically precede all Role Associated Keys (e.g. the button numbering for the Role Associated Keys of Table 2 begins with 49).

Also, a person of skill in the art will appreciate that navigation between pages/tabs of keys is not affected by the introduction of Role Associated Keys that are available dependent on the "active" Role. However, when navigation returns to the page/tab that contains the Role Keys and Role Associated Keys, determination of which Role Associated Keys are presented may be a result of a different "active" Role than previously presented.

The Role Associated Keys 41, 51, 61, 121, 131 and 141 for the Prime Line (key 19) of the telephone set comprise the normally-configured programmable keys (i.e. not new Role Associated Keys). By default, or after selecting the Prime Line 19, the normally-configured programmable keys are available as Role Associated Keys (thereby maintaining existing telephone set behaviour).

However, when a different Role Key (21, 31, 91, 101 or 111), is selected the corresponding Role Associated Keys 41, 51, 61, 121, 131 and 141 effectively 'overlay' the normally-configured programmable keys on the telephone 5. This functionality is performed by a Role Management application (operative ideally in the telephone 5; alternatively as a proxy in the iPBX 1). The Role Management application continually manages all Role Associated Keys as though these keys are always available physically on the telephone 5.

The labels/leds/behaviours associated with each Role Associated Key 41, 51, 61, 121, 131 and 141 is updated by the Role Management application to reflect the corresponding button number for the Role Associated Key of the "active" Role as selected by the user. An explicit/specific user action may optionally be involved, in addition to selecting a Role Key, prior to updating the Role Associated Keys.

Additionally, the configuration of a colour associated with each Role Key label (e.g. as selected by the user in a Settings Shutter application) may be used by the Role Management application such that the background display colour for programmable key labels on the telephone set designated as Role Associated Keys are updated to match the "active" Role Key label (which may selectively display the colour background). The background colour of the Role Key label may optionally be altered to reflect activity that is occurring on Role Associated Keys that are not displayed with the selected Role, for example by increasing hue and/or brightness.

Figure 3:
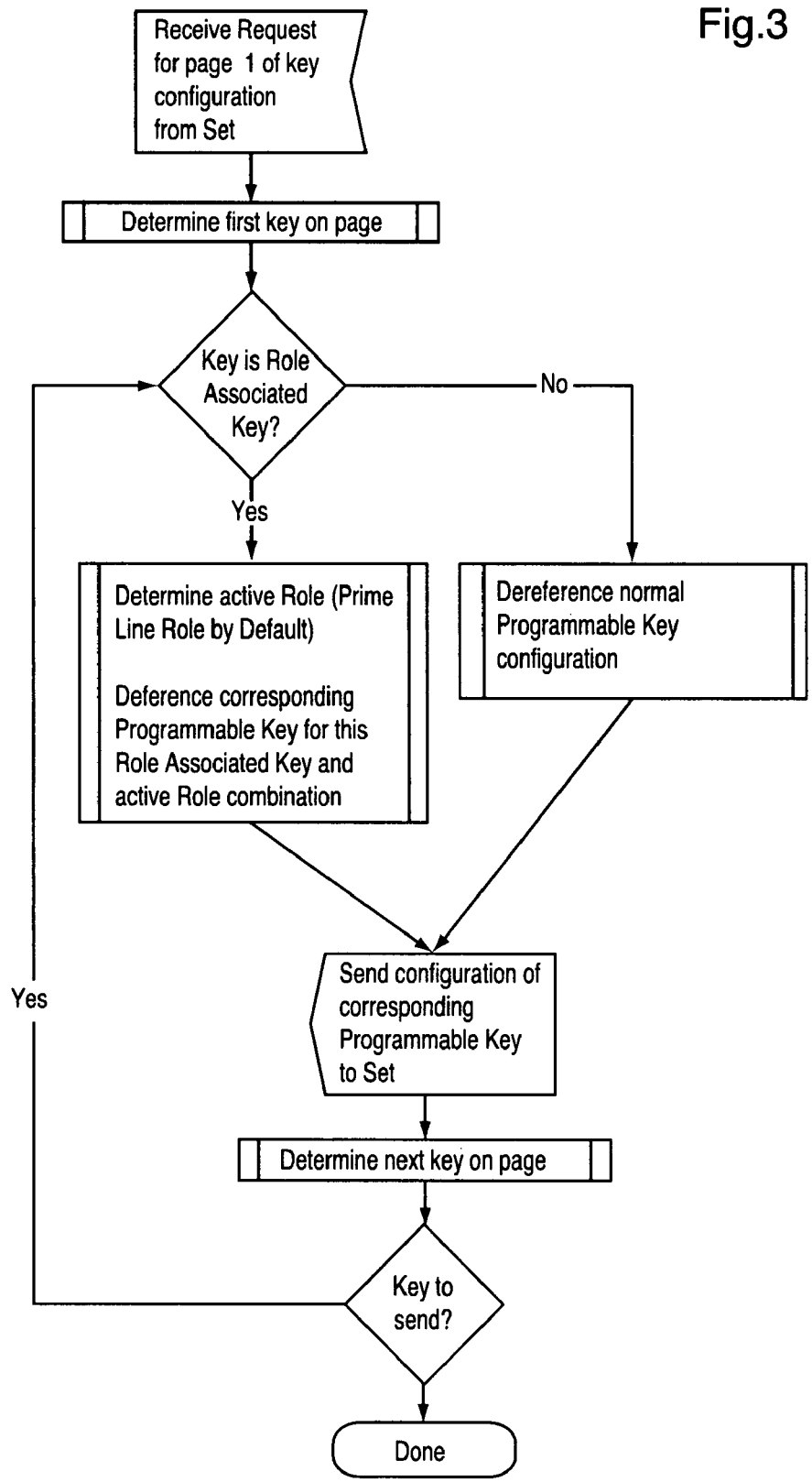
FIG. 3 is a flowchart showing method steps for configuring programmable keys associated with a Prime Line of the telephone appliance of FIG. 2, according to an aspect of an embodiment.

Turning to FIG. 3, a flowchart for a portion of the Role Management application method sets forth steps for configuring programmable keys associated with the Prime Line key 19 of the exemplary telephone of FIG. 2. Upon receipt of a request for the first page (prime line) of key configurations from the telephone 5 (step 300), the application determines the first key on that page (step 310). If that key is a Role Associated Key 41, 51, 61, 121, 131 or 141 (i.e. a "Yes" at step 320), the application determines the active role and dereferences the corresponding programmable key for the Role Associated Key and active role combination (step 330). If the first key is not a Role Associated Key (i.e. a "No" at step 320), then the application dereferences the normal programmable key configuration (step 340).

Next, at step 350, the application sends the configuration for the corresponding programmable key to the telephone. The application then determines the next key on the page (step 360), and if there is a key to send (i.e. a "Yes" at step 370), re-executes step 320. Otherwise, the method ends (step 380).

FIG. 4 is a flowchart showing method steps of the Role Management application responsive to user selection of a programmed key at the exemplary telephone of FIG. 2. Upon receipt of a key press indication at the telephone (step 400, the application determines whether the pressed key is a Role Associated Key (i.e. a "Yes" at step 410), in response to which the application determines the active role for the telephone and dereferences the corresponding programmable key for the pressed Role Associated Key and role combination (step 420).

If the pressed key is not a Role Associated Key (i.e. a "No" at step 410), the application determines whether the pressed key is a Role Key (step 430). If it is, the application determines the new active role (step 440) and sends an indication of the new active role to the telephone (step 450) and the method ends (step 460). If the pressed key is a Role Key (i.e. a "No" at step 430), the process simply ends (step 460).

FIG. 5 is a flowchart showing method steps for configuring Role Associated Keys associated with an active Role Key of the telephone shown in FIG. 2. Upon receipt of a request for Role Associated key configurations from the telephone 5 (step 500), the application determines the first key on that page (step 510). If that key is a Role Associated Key 41, 51, 61, 121, 131 or 141 (i.e. a "Yes" at step 520), the application determines the active role and dereferences the corresponding programmable key for the Role Associated Key and active role combination (step 530), and at step 540, sends the configuration for the corresponding programmable key to the telephone. If either the first key is not a Role Associated Key (i.e. a "No" at step 520) or following execution of step 540, the application then determines the next key on the page (step 550), and if there is a key to send (i.e. a "Yes" at step 560), re-executes step 520. Otherwise, the method ends (step 570).

The present invention has been described with respect to a preferred embodiment. Other embodiments, variations and applications of the invention are possible. For example, the designation of Role Keys, Role Associated Keys and Role Independent Keys can be extended to additional user input mechanisms (in addition to telephone programmable keys). In addition to use for telephone sets with self-labeling programmable keys, the principle set forth herein can be applied to touch screen user input devices. Designations may also be applied on individual keys rather than on groups of keys.

As well, the principles set forth herein may be applied to other devices (non-telephony) with a number of Roles that can be user-selected resulting in associated context affected and context independent keys.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A non-transitory computer readable storage medium storing an application executable on a telephone device,
the application including instructions which, when executed on the telephone device,
cause the telephone device to configure a plurality of self-labeling Role Keys to represent a plurality of respective predetermined user roles and a plurality of self-labeling Role Associated Keys associated with respective ones of said self-labeling Role Keys such that upon user selection of one of said self-labeling Role Keys and selection representing a current active user role, said plurality of self-labeling Role Associated Keys are presented to said user for invoking a feature associated with said current active user role,
wherein for each of said self-labeling Role Keys said plurality of self-labeling Role Associated Keys are presented on said telephone as an overlay of said programmable feature keys configured for a prime line of said telephone.

2. The non-transitory computer readable storage medium of claim 1, wherein said feature is a telephony feature.

3. The non-transitory computer readable storage medium of claim 1, wherein each said self-labeling Role Keys comprise programmable feature keys on said telephone.

4. The non-transitory computer readable storage medium of claim 3, wherein said programmable feature key is selected from the group comprising directory number, line appearance, and speed call.

5. The non-transitory computer readable storage medium of claim 1, wherein each said self-labeling Role Associated Keys comprise programmable feature keys on said telephone.

6. The non-transitory computer readable storage medium of claim 1, wherein said user roles are indicated by illuminating said self-labeling Role Keys with respective colours.

7. A method of configuring a telephone device, comprising:
configuring a plurality of self-labeling Role Keys to represent a plurality of respective predetermined user roles; and
configuring a plurality of self-labeling Role Associated Keys associated with respective ones of said self-labeling Role Keys such that upon user selection of one of said self-labeling Role Keys and selection representing a current active user role, said plurality of self-labeling Role Associated Keys are presented to said user for invoking respective features associated with said current active user role,
wherein for each of said self-labeling Role Keys said plurality of self-labeling Role Associated Keys are presented on said telephone as an overlay of said programmable feature keys configured for a prime line of said telephone.

8. The method of claim 7, wherein said self-labeling Role Keys comprise programmable feature keys on said telephone.

9. The method of claim 8, wherein said programmable feature key is selected from the group comprising directory number, line appearance, and speed call.

10. The method of claim 7, wherein said user roles are indicated by illuminating said self-labeling Role Keys with respective colours.

11. The method of claim 7, wherein said feature is a telephony feature.

* * * * *